J. E. GILSON.
LAWN EDGE TRIMMER.
APPLICATION FILED JULY 30, 1919.
1,325,014.
Patented Dec. 16, 1919.
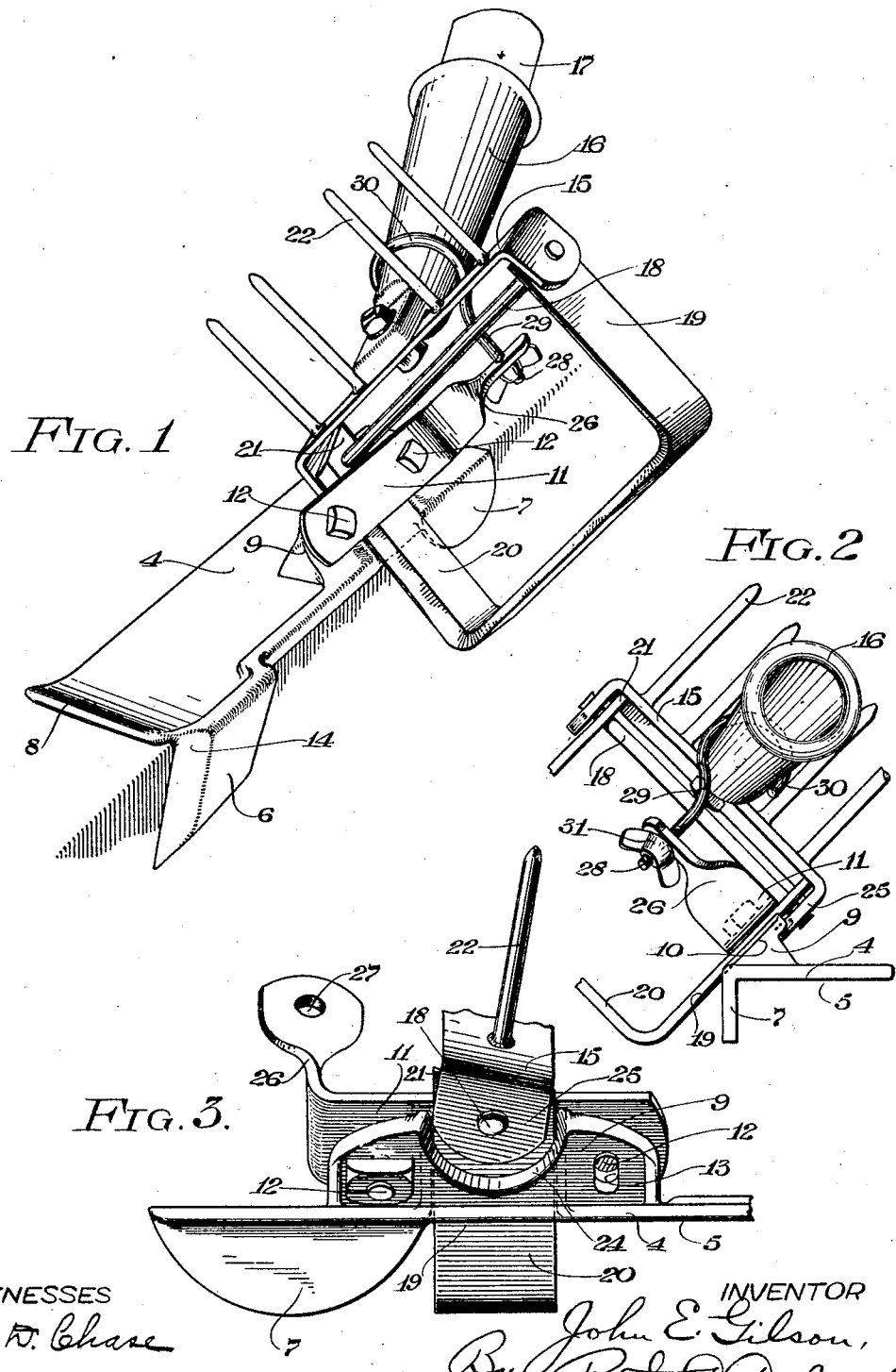

UNITED STATES PATENT OFFICE.

JOHN E. GILSON, OF PORT WASHINGTON, WISCONSIN.

LAWN-EDGE TRIMMER.

1,325,014.     Specification of Letters Patent.     Patented Dec. 16, 1919.

Application filed July 30, 1919. Serial No. 314,364.

*To all whom it may concern:*

Be it known that I, JOHN E. GILSON, a citizen of the United States, and resident of Port Washington, in the county of Ozaukee and State of Wisconsin, have invented new and useful Improvements in Lawn-Edge Trimmers, of which the following is a description, reference being had to the accompanying drawings, which are a part of this specification.

The invention relates to a lawn edge trimmer and more particularly to an attachment and its combination with a garden tool of the type shown in U. S. Letters Patent No. 1,167,491 of January 11, 1916, to John Gilson, Sr., so that this tool may be used as a lawn edge trimmer.

The invention further consists in the several features hereinafter set forth and more particularly defined by claims at the conclusion hereof.

In the drawings: Figure 1 is a perspective view of the device embodying the invention; Fig. 2 is a detail rear end view of the device, parts being broken away; Fig. 3 is a detail side view of the device.

The attachment consists of a member 4 having a flat bottom 5, guide lugs 6 and 7 disposed at right angles thereto and a curved end 8. The member 4 also has a bracket portion 9 having an inclined side 10 and a portion of the garden tool is adapted to be clamped to this portion 9 by means of a plate clip or strap 11 and clamping bolts 12 passing through elongated slots 13 in said portion 9. The front edge 14 of the lug 6 is beveled so as to better part the soil in front of it as the member is drawn over the sidewalk adjacent the edge thereof.

The garden tool with which the attachment is designed to be used consists of a U-shaped bail 15 secured intermediate its ends to a socket member 16 receiving a handle 17, a shaft 18 mounted in the arms 19 of the bail 15 and a U-shaped cutting member 20 pivotally mounted on the shaft 18 and having a limited swinging movement in either direction with respect to the piece 15, the upper ends 21 of said member 20 forming stops to engage the bail 15 to limit the swinging movement of the blade with respect to its supporting member such as the bail 15. As here shown the member 15 is provided with tines or rake teeth 22 so that when the tool is inverted it may be used as a rake.

As previously stated, the object of the invention is to provide an attachment for a garden tool such as that described so as to use said tool as a lawn edge trimmer. This is effected by clamping one of the arms of the member 20 to the portion 9 of the member 4 by the plate 11 and bolts 12, the slots 13 providing for the adjustment of the member 20 to cut trenches of various depths.

With the particular form of tool shown the bracket 9 is provided with a notch 24 to receive the end 25 of the member 15 and to hold the member 20 against any possibility of swinging movement with respect to the handle 17 the plate 11 has an upturned end 26 apertured at 27 to receive the threaded end 28 of a hooked member 29, the hook end 30 of said member engaging the socket 16 and the threaded end 28 carrying a wing nut 31 to clamp said member 29 to said plate 11.

When the parts are thus clamped together as shown in Fig. 1, the blade 20 is supported in an inclined position upon the attachment so that it will cut a V-shaped trench in the soil adjacent the sidewalk along the edge of which the attachment is being moved, the attachment serving to guide and gage the tool in making the cut.

It is to be understood that the invention is not to be limited to any specific form or arrangement of parts except in so far as such limitations are specified in the claims.

What I claim as my invention is:

1. The combination, with a garden tool having a U-shaped cutting blade and a handle, of an attachment secured to said tool for supporting and guiding said cutting blade in an inclined position to form a V-shaped cutter of one corner of the blade.

2. The combination, with a garden tool having a handle and a U-shaped blade operatively connected thereto for limited swinging movement, of an attachment for supporting and guiding said blade in inclined position to form a V-shaped cutter of one corner of the blade, and means for securing said blade to said attachment and preventing its movement with respect to said handle.

3. The combination, with a garden tool having a U-shaped cutting blade and a handle, of a member having an inclined portion to which the tool is adapted to be secured in inclined position and provided with means to guide the tool, and means for clamping one of the arms of the blade to the inclined portion of said member to form a U-shaped cutter of one corner of the blade.

4. The combination, with a garden tool having a handle and a U-shaped blade operatively connected thereto for limited swinging movement, of an attachment for supporting and guiding the cutting blade in inclined position, comprising an angled guide member provided with an inclined support, a plate and bolts to secure one of the arms of the blade to the support, and a connection between said plate and the handle to prevent movement of the blade with respect to the handle.

In testimony whereof, I affix my signature.

JOHN E. GILSON.